3,026,340
PROCESS FOR THE MANUFACTURE OF A NEW
16α-METHYL-17α-HYDROXY-ALLOPREGNANE
Albert Wettstein, Riehen, and Georg Anner, Charles Meystre, Peter Wieland, Ludwig Ehmann, Karl Heusler, Alfred Hunger, and Jindrich Kebrle, Basel, Switzerland, assignors to Ciba Pharmaceutical Products Inc., Summit, N.J.
No Drawing. Filed Dec. 23, 1959, Ser. No. 861,427
Claims priority, application Switzerland Dec. 24, 1958
4 Claims. (Cl. 260—397.45)

The present invention relates to an industrially simple and advantageous process for the manufacture of 16α-methyl-allopregnane-3β:11α:17α-triol-20-one from $\Delta^{17(20)}$-16α-methyl-3β:11α:20-triacetoxy-allopregnene.

A known process for the introduction of a 17α-hydroxy group into 20-keto-pregnane compounds which bear no substituents in the 16-position consists in converting the 20-ketone into a $\Delta^{17(20)}$-enol acetate, oxidizing the latter for a few hours with an organic peracid and then hydrolysing the acetate groups present in aqueous alkaline solution.

The application of the above process using 16α-methyl-allopregnane-3β:11α-diol-20-one as starting material results, however, in only a poor yield of the corresponding 17α-hydroxy compound. It has now been found that the yield can be considerably increased and that a completely pure 17α-hydroxy-ketone can be obtained in a simple manner by oxidizing $\Delta^{17(20)}$-16α-methyl-3β:11α:20-triacetoxy-allopregnene with an organic peracid, splitting the ester groups in the oxidation product by transesterification with an anhydrous lower alkanol in the presence of an anhydrous alkali metal alcoholate, and purifying the resulting crude 16α-methyl-allopregnane-3β:11α:17α-triol-20-one by treatment with a lower aliphatic ketone.

$\Delta^{17(20)}$-16α-methyl-3β:11α:20-triacetoxy-allopregnene is advantageously prepared by the process described in detail in the examples. It consists in reacting methyl magnesium iodide with the known $\Delta^{16}$-3β:11α-diacetoxy-allopregnene-20-one dissolved in tetrahydrofuran in the presence of cuprous chloride and acetylating the resulting 16α-methyl-20-enol metal salt by the addition of acetyl chloride.

The oxidation of the 20-enol acetate is carried out with an organic peracid, particularly, for example, with perbenzoic acid, monoperphthalic acid or peracetic acid. As solvent there is used ether, such as diethyl ether or tetrahydrofuran, aromatic hydrocarbons, such as benzene or toluene, or aliphatic esters, such as acetic acid ethyl ester or mixtures of these solvents. It has also been observed that the oxidation which is completed in a few hours in the case of 16-unsubstituted 20-enol acetates, takes a much slower course in the case of 16α-methyl compounds and takes several days when carried out at room temperature and using an aromatic peracid.

Whereas in the case of 16-unsubstituted 17:20-epoxy-11α:20-diacetates the hydrolysis of the ester groups with aqueous alcoholic potassium hydroxide solution or with potassium carbonate results in a good yield, the hydrolysis of 16α-methyl-3β:11α:20-triacetoxy-17:20α-oxido-allopregnane under the same conditions is incomplete, since the hydrolysis of the 11α-acetoxy group by the 16α-methyl group is rendered much more difficult. If the hydrolysis time is prolonged or the reaction temperature or alkali concentration increased, an increasing number of side products are formed which reduce the yield of 16α-methyl-allopregnane-3β:11α:17α-triol-20-one and render the isolation of the pure end product more difficult. It has now been found that these difficulties can be avoided by carrying out the removal of the ester groups not by hydrolysis in an aqueous medium, but by transesterification with an anhydrous alcohol, preferably a lower aliphatic alcohol, such as methanol, ethanol or propanol. As catalyst there is used an anhydrous alkali metal alcoholate, such as sodium methylate or potassium ethylate. With a catalyst concentration of 0.5 mol per liter the reaction takes 24–48 hours at room temperature to reach completion without the formation of disturbing by-products and without any substantial reduction in the concentration of the catalyst. In the case of a smaller concentration of alcoholate, the reaction time must be correspondingly prolonged and/or the reaction temperature raised. Vice versa, in the case of a higher concentration of catalyst the reaction time can be shortened.

When transesterification is complete, the reaction product is isolated in known manner. Since 16α-methyl-allopregnane-3β:11α:17α-triol-20-one is sparingly soluble in the usual solvents, purification by recrystallization is difficult and expensive on an industrial scale. However, it has been found that the crude product resulting from transesterification can be purified in an extremely simple manner by treating the crude 16α-methyl-allopregnane-3β:11α:17α-triol-20-one with a lower aliphatic ketone, for example with acetone, methyl-ethyl ketone or diethyl-ketone. This treatment is carried out, for example, by pasting or suspending the crude product in the above solvent, all the by-products and impurities (and any not completely hydrolysed constituents) being dissolved. 16α-methyl-allopregnane-3β:11α:17α-triol-20-one is obtained in completely pure form by simple suction-filtering.

The product of the process is an extremely important and valuable intermediate for the manufacture of 16α-methyl-corticoids, especially, for example, of 16α-methyl-prednisone, 16α-methyl-9α-fluoro-prednisolone and 16α-methyl-9α-fluoro-prednisone which are distinguished by a particularly strong anti-inflammatory effect without having the side-effect of sodium retention or only to a slight degree.

The product of the process is especially suitable for the preparation of these highly active hormones. It can be converted into $\Delta^{1,4}$-16α-methyl-21-acetoxy-pregnadiene-11α:17α-diol-3:20-dione by the processes described in U.S. patent applications Serial No. 824,210 filed July 1, 1959, by Albert Wettstein et al. and Serial No. 824,209 filed July 1, 1959, by Albert Wettstein et al. or Serial No. 861,430 filed December 23, 1959, by Albert Wettstein et al. These processes consist in halogenating 16α-methyl-allopregnane-3β:11α:17α-triol-20-one in the 21-position, reacting the halide with a salt of an organic acid, particularly with potassium acetate, then oxidizing the hydroxyl group in the 3-position selectively, for example with bromacetamide in aqueous acetone, and finally introducing a 1:2- and 4:5-double bond with selenium dioxide or by bromination and dehydrobromination.

The 11α-hydroxy group can be split off in practically quantitative yield with the formation of a 9:11-double bond before or after introduction of the double bonds in the ring A by tosylation and treatment of the tosylate with lithium chloride in dimethyl-formamide.

The conversion of the 9:11-double bond into 9α-fluoro-11β-hydroxy grouping takes place by known methods. Hypobromous acid is additively combined in the presence of perchloric acid, hydrobromic acid is split off by means of a basic agent, for example with potassium acetate or potassium hydroxide, and the 9:11β-epoxides formed are subjected to the action of hydro-fluoric acid.

The corresponding 11-ketones are obtained by oxidizing the 11α- or 11β-hydroxy group, for example with a chromic acid-pyridine complex.

The $\Delta^{17(20)}$-16α-methyl-3β:11α:20-triacetoxy-allopregnene used as starting material in the present process is easy to prepare from hecogenin from sisal agaves. The present process is consequently an important step in the synthesis of the above-mentioned valuable 16α-methyl hormones from raw materials which are easily accessible and available in large quantities.

The following examples illustrate the invention.

*Example 1*

10 cc. of 1.4-molar monoperphthalic acid in ether are added with cooling in a bath of 22° C. to a solution of 4.68 grams of crystalline isomeric mixture of the two $\Delta^{17(20)}$ - 16α - methyl-3β:11α:20-triacetoxy-allopregnenes (obtained from 6.75 grams of $\Delta^{16}$-3β:11α-diacetoxy-allopregnene-20-one by reaction with methyl magnesium iodide and acetyl chloride as described hereinafter) in 10 cc. of ether, and the whole is allowed to stand for 4 days at room temperature. After the addition of 120 cc. of ether, extraction is carried out once with 20 cc. of saturated sodium bicarbonate solution, three times with 20 cc. of sodium hydroxide solution, twice with 20 cc. of water, once with 20 cc. of 0.1 N-sodium thiosulfate solution and twice with 20 cc. of water. The aqueous solutions are extracted twice with 120 cc. of ether and the ethereal solutions are combined, dried and evaporated.

The residue is dissolved in 50 cc. of 0.5 N-sodium methylate solution in absolute methanol and allowed to stand for 40 hours under nitrogen at room temperature; 1.5 cc. of glacial acetic acid are then added, the mixture is evaporated to dryness in a water-jet vacuum, the residue well agitated with 25 cc. of water, suction-filtered and the filter residue washed with cold acetone and a mixture of acetone and ether. 2.782 grams of pure 16α-methyl-allopregnane-3β:11α:17α-triol-20-one melting at 244–248° C. (sintering from 235° C.) are obtained.

The filtrate is evaporated to dryness, the residue taken up in methylene chloride and the solution washed with water, dried and again evaporated. By acetylation with 2.5 cc. of acetic anhydride and 2.5 cc. of pyridine there are obtained after working up in the customary manner and by crystallization from a mixture of ether and hexane another 780 mg. of 16α-methyl-3β:11α-diacetoxy-allopregnane-17α-ol-20-one melting at 168–174° C. which can, in its turn, be hydrolysed with sodium methylate as shown above.

The $\Delta^{17(20)}$-enol acetate used as starting material can be prepared as follows:

190 cc. of absolute tetrahydrofuran are added to a solution of methylmagnesium iodide, prepared from 1 gram of magnesium, in 80 cc. of ether, and 150 cc. of the solvent are then distilled off in the course of half an hour. The remaining solution is cooled to 20° C. and 250 mg. of cuprous chloride are first added, and then a solution of 6.75 grams of $\Delta^{16}$-3β:11α-diacetoxy-allopregnene-20-one in 50 cc. of absolute tetrahydrofuran is added in the course of 1¼ minutes at a bath temperature of 20° C. and rinsed out of the container with 10 cc. of tetrahydrofuran. The temperature rises to 29° C., and the reaction mixture turns a yellow color. After stirring for 30 minutes, a mixture of 3 cc. of acetyl chloride and 25 cc. of tetrahydrofuran is added dropwise in the course of 1¾ minutes with cooling in a bath of 20° C., the temperature rising to 28° C. and the color changing from yellow to grey. Stirring is continued for 40 minutes at room temperature, the mixture is cooled to 5° C., and 30 cc. of saturated ammonium chloride solution, 50 cc. of ether and 30 cc. of water are added in succession. The contents of the flask consisting of two clear layers are rinsed into a separating funnel with 100 cc. of ether and well agitated, the aqueous phase is separated and then again extracted with 75 cc. of ether. The organic phases are extracted in succession twice with 50 cc. of 1-molar sodium thiosulfate solution, a mixture of 50 cc. of saturated sodium chloride solution and 15 cc. of saturated sodium bicarbonate solution and twice with 50 cc. of saturated sodium chloride solution, dried with magnesium sulfate and then evaporated first at normal pressure and then in a water-jet vacuum. The residue is dissolved in xylene, evaporated under reduced pressure, and this operation is repeated once. The solution of the resulting oil in 50 cc. of hexane is filtered through 8 grams of aluminum oxide (Activity III). The container is rinsed with 250 cc. of hexane, the eluate evaporated in a water-jet vacuum and the residue dried for 1½ hours at 80° C. and under 0.05 mm. of pressure in a rotating evaporator. A considerable quantity of sweet-smelling oil is distilled off. The remaining, practically colorless lacquer weighing 8.6 grams is dissolved in 10 cc. of pentane and allowed to stand for several days at —15° C. The precipitated crystals are filtered off, washed with cold pentane and dried for 4 hours at 80° C. under 0.05 mm. of pressure. 4.7 grams of $\Delta^{17(20)}$ - 16α-methyl-3β:11α:20-triacetoxy-allopregnene are obtained as a stereoisomeric mixture melting at 123.5–129° C. Owing to its ready solubility, there are still considerable quantities of the above enol acetate in the mother liquor. The infrared spectrum taken up in methylene chloride of the crystalline enol acetate shows inter alia the following characteristic bands: at 5.78μ with inflexion at 5.73μ and a weak shoulder at 5.86μ (acetates and enol double bond); 8.11μ (acetates).

*Example 2*

51 grams of crude oily $\Delta^{17(20)}$-16α-methyl-3β:11α:20-triacetoxy-allopregnene are dissolved in 150 cc. of acetic acid ethyl ester, and 300 cc. of acetic acid ethyl ester containing 30 grams of monoperphthalic acid are added at room temperature. After 3 days the reaction mixture is washed in three portions with a total quantity of 350 cc. of sodium carbonate solution of 20% strength and with water with the addition of a little sodium thiosulfate, the aqueous extracts are extracted with ethyl acetate and the combined organic solutions dried and evaporated in a water-jet vacuum. The residue, which is crude 16α-methyl - 3β:11α:20-triacetoxy-17:20α-oxido-allopregnane, is dissolved in 315 cc. of absolute methanol, and 315 cc. of 1.0 N-sodium methylate in absolute methanol are added under nitrogen and the whole allowed to stand for 46 hours at room temperature. 18 cc. of glacial acetic acid are then added and the reaction mixture is concentrated to a volume of 240 cc., cooled and the reaction product precipitated by the addition of 140 ml. of water. The precipitate is suction-filtered, washed well with water and finally with 150 cc. of acetone and dried. 28 grams of pure 16α - methyl - allopregnane-3β:11α:17α-triol-20-one melting at 242–244° C. are obtained.

From the filtrate a further quantity of the above triol can be isolated in the form of the diacetate by acetylation as described in Example 1.

The crude enol acetate used in this example can be prepared as follows:

5.6 grams of magnesium chippings are added in small portions to a mixture of 16.3 cc. of methyl iodide in 120 cc. of ether with stirring and under nitrogen and the mixture is boiled under reflux for one hour after the reaction is complete. The reaction mixture is cooled to —10° C. and 150 cc. of tetrahydrofuran, 1.85 grams of cuprous chloride and finally in the course of one hour a solution of 50 grams of $\Delta^{16}$-3β:11α-diacetoxy-allopregnene-20-one in 150 cc. of tetrahydrofuran are added. When the addition is complete stirring is continued for one hour at —5 to 0° C., and 17 cc. of acetyl chloride are then added dropwise in the course of one hour with cooling. Half an hour later a solution of 90 grams of ammonium chloride, 5 grams of sodium acetate and 5 grams of sodium thiosulfate is added and the mixture is extracted several times with petroleum ether. The petroleum ether extracts are dried with sodium sulfate and evaporated in a water-jet vacuum. For further purification the crude enol acetate is dissolved in 600 cc. of petroleum ether and stirred with 60 grams of aluminum oxide (Activity II) for one hour.

The mixture is suction-filtered and the filtrate evaporated and degassed at 70–80° C. in a high vacuum. The residue (51 grams) is crude $\Delta^{17(20)}$-16α-methyl-3β:11α:20-triacetoxy-allopregnene.

What is claimed is:

1. Processes for the manufacture of a new 16α-methyl-17α-hydroxy-20-ketone of the allopregnane series, wherein $\Delta^{17(20)}$ - 16α-methyl-3β:11α:20-triacetoxy-allopregnene is oxidized with an organic peracid, the ester groups in the oxidation product split by transesterification with an anhydrous lower alkanol in the presence of an anhydrous alkali metal alkanolate, and the resulting crude 16α-methyl-allopregnane-3β:11α:17α-triol-20-one purified by treatment with a lower aliphatic ketone.

2. Process as claimed in claim 1, wherein the peracid oxidation is carried out with an aromatic peracid at room temperature for more than 10 hours.

3. Process as claimed in claim 1, wherein transesterification is carried out with absolute methanol in the presence of sodium methylate.

4. Process as claimed in claim 1, wherein acetone is used for purifying the crude 16α-methyl-allopregnane-3β:11α:17α-triol-20-one.

References Cited in the file of this patent

UNITED STATES PATENTS

| | | |
|---|---|---|
| 2,751,398 | Hunt et al. | June 19, 1956 |
| 2,773,079 | Djerassi et al. | Dec. 4, 1956 |
| 2,970,157 | Cutler et al. | Jan. 31, 1961 |